US012755860B2

(12) United States Patent
Odachi et al.

(10) Patent No.: US 12,755,860 B2
(45) Date of Patent: *Oct. 6, 2026

(54) Cu—Ag ALLOY WIRE AND METHOD FOR PRODUCING THE SAME

(71) Applicant: SWCC Corporation, Kawasaki (JP)

(72) Inventors: Go Odachi, Kawasaki (JP); Rikuya Watanabe, Kawasaki (JP); Ryuichi Arai, Kawasaki (JP)

(73) Assignee: SWCC Corporation, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/700,425

(22) PCT Filed: May 24, 2023

(86) PCT No.: PCT/JP2023/019364

§ 371 (c)(1),
(2) Date: Apr. 11, 2024

(87) PCT Pub. No.: WO2023/238671

PCT Pub. Date: Dec. 14, 2023

(65) Prior Publication Data

US 2024/0339238 A1 Oct. 10, 2024

(30) Foreign Application Priority Data

Jun. 7, 2022 (JP) ................................. 2022-092485

(51) Int. Cl.
*H01B 1/02* (2006.01)
*B21C 1/02* (2006.01)
(Continued)

(52) U.S. Cl.
CPC ............... *H01B 1/026* (2013.01); *B21C 1/02* (2013.01); *B21F 15/04* (2013.01); *C22F 1/08* (2013.01); *H01B 13/0016* (2013.01)

(58) Field of Classification Search
None
See application file for complete search history.

(56) References Cited

U.S. PATENT DOCUMENTS 7,544,886 B2 6/2009 Detian et al.
2020/0312480 A1 10/2020 Saka et al.
(Continued)

FOREIGN PATENT DOCUMENTS

CN 102869805 A 1/2013
CN 211027871 U * 7/2020
(Continued)

OTHER PUBLICATIONS

Zhang (Materials Letters, vol. 58, 2004, p. 3888-3892). (Year: 2004).*
(Continued)

*Primary Examiner* — Xiaowei Su
(74) *Attorney, Agent, or Firm* — The Roy Gross Law Firm, LLC; Roy D. Gross

(57) ABSTRACT

An object of the present invention is to provide a Cu—Ag alloy wire that has satisfactory hardness and specific resistance both suitable for probe pins. A Cu—Ag alloy wire that achieves the above object contains 0.1 to 30 mass % of Ag, with a remainder composed of Cu and unavoidable impurities. The Cu—Ag alloy wire has a Vickers hardness of 300 HV or more and a specific resistance of 3.0μΩ·cm or less.

4 Claims, 3 Drawing Sheets

(51) Int. Cl.

| | |
|---|---|
| ***B21F 15/04*** | (2006.01) |
| ***C22F 1/08*** | (2006.01) |
| ***H01B 13/00*** | (2006.01) |

(56) References Cited

U.S. PATENT DOCUMENTS

| | | | |
|---|---|---|---|
| 2021/0088552 | A1 | 3/2021 | Sato et al. |
| 2021/0285080 | A1 | 9/2021 | Saito et al. |
| 2021/0332467 | A1 | 10/2021 | Liu et al. |

FOREIGN PATENT DOCUMENTS

| | | | | |
|---|---|---|---|---|
| CN | 114395710 | A | * | 4/2022 |
| JP | 2000199042 | A | * | 7/2000 |
| JP | 2004055179 | A | | 2/2004 |
| JP | 2007113093 | A | | 5/2007 |
| JP | 2011146352 | A | | 7/2011 |
| JP | 2011246802 | A | | 12/2011 |
| JP | 5344151 | B2 | | 11/2013 |
| JP | 2019026921 | A | | 2/2019 |
| JP | 2019143981 | | | 8/2019 |
| JP | 2020167099 | A | | 10/2020 |
| JP | 2021099346 | A | | 7/2021 |
| JP | 2022028598 | A | | 2/2022 |
| WO | 2019031612 | A1 | | 2/2019 |

OTHER PUBLICATIONS

Machine translation of CN114395710A. Apr. 26, 2022. (Year: 2022).*

Machine translation of JP2000-199042A. (Year: 2000).*

Machine translation of CN211027871U. (Year: 2020).*

PCT International Search Report for International Application No. PCT/JP2023/019364, mailed Jun. 27, 2023, 7pp.

PCT Written Opinion for International Application No. PCT/JP2023/019364, mailed Jun. 27, 2023, 5pp.

S. Chenna Krishna et al: "On the Prediction of Strength from Hardness for Copper Alloys", Journal of Materials, Hindawi Publishing Corporation, US,vol. 2013, Jan. 1, 2013 (Jan. 1, 2013), pp. 1-6, XP007922200, ISSN: 2314-4866, DOI: 10.1155/2013/352578.

European Patent Office, Supplementary European Search Report for European Patent Application No. 23819463.3, dated May 29, 2026, 11pp.

* cited by examiner

Cu—Ag ALLOY WIRE AND METHOD FOR PRODUCING THE SAME

TECHNICAL FIELD

The present invention relates to a Cu—Ag alloy wire and a method for producing the same.

BACKGROUND ART

For testing the electrical properties of a test target such as a semiconductor integrated circuit, a probe card with a plurality of probe pins arranged thereon is used. The electrical properties are tested by bringing the tip of the probe pin into contact with the test site of the test target.

Probe pins are used by repeatedly coming into contact with the test target site thousands to tens of thousands of times, thus are required to have sufficient "hardness." Probe pins are also required to have a low "specific resistance" in order to satisfactorily input and output test signals through the probe pins. For example, when the Vickers hardness is 300 to 400 HV and the specific resistance is 3.0 μΩ·cm or less, the above requirements for hardness and specific resistance are considered to be satisfied.

Conventional materials for probe pins include Pd alloy and Be alloy; however, Pd alloy has a Vickers hardness of 300 to 380 HV and a specific resistance of about 30 μΩ·cm, even Be alloy has a Vickers hardness of about 250 HV and a specific resistance of about 2.6 μΩ·cm. Such conventional materials have not yet simultaneously satisfied the requirements of hardness and specific resistance that can be applied to probe pins.

Patent Literature (hereinafter, referred to as PTL) 1 discloses a Cu alloy that can be used for a probe pin.

According to the technology of PTL 1, the amounts of Ag and In to be added are adjusted, and plastic working is performed in such a way that the cross-section reduction rate becomes 75 to 95%, thereby possibly improving the hardness and reducing the specific resistance suitable for the use as a probe pin (paragraphs 0019 and 0024 to 0027).

CITATION LIST

Patent Literature

PTL 1

Japanese Patent Application Laid-Open No. 2019-26921

SUMMARY OF INVENTION

Technical Problem

From the Examples of PTL 1, however, the Cu alloy has a Vickers hardness after plastic working of at most about 300 HV, and a specific resistance after plastic working of about 4.1 to 8.6 μΩ·cm; therefore, it cannot be said that the Cu alloy has satisfactory hardness and specific resistance both suitable for a probe pin.

The main object of the present invention is to provide a Cu—Ag alloy wire that has satisfactory hardness and specific resistance both suitable for probe pins and a method for producing such a Cu—Ag alloy wire.

Solution to Problem

In order to achieve the above object, one aspect of the present invention provides the following.

A Cu—Ag alloy wire, containing:

0.1 to 30 mass % of Ag, with a remainder composed of Cu and unavoidable impurities, in which the Cu—Ag alloy wire has a Vickers hardness of 300 HV or more and a specific resistance of 3.0μΩ·cm or less.

Another aspect of the invention provides the following:

A method for producing a Cu—Ag alloy wire, the method including:

casting a bar material containing 0.1 to 30 mass % of Ag, with a remainder composed of Cu and unavoidable impurities;

heating the bar material at 300 to 700° C. for 1 to 60 hours in a vacuum or an inert gas atmosphere;

producing a first wire rod by drawing the bar material at a degree of cold working of 2.3 or more, the bar material having been subjected to the heating;

heating the first wire rod at 300 to 700° C. for 1 to 60 hours in a vacuum or an inert gas atmosphere; and producing a second wire rod by drawing the first wire rod at a degree of cold working of more than 7.2, the first wire rod having been subjected to the heating.

Advantageous Effects of Invention

The present invention is capable of providing a Cu—Ag alloy wire that has satisfactory hardness and specific resistance both suitable for probe pins (the Cu—Ag alloy wire having Vickers hardness of 300 HV or more and specific resistance of 3.0 μΩ·cm or less) and a method for producing such a Cu—Ag alloy wire (see Examples below).

DESCRIPTION OF EMBODIMENTS

Hereinafter, a Cu—Ag alloy wire and a method for producing the same according to a preferred embodiment of the present invention will be described. Herein, with respect to the term "to" indicating a numerical range, the lower limit and upper limit are included in the numerical range.

(1) Cu—Ag Alloy Wire

The Cu—Ag alloy wire has a composition containing 0.1 to 30 mass %, preferably 10 to 15 mass % of Ag, with a remainder composed of Cu and unavoidable impurities. The Cu—Ag alloy wire has a structure in which a Cu-based solid solution phase, a Cu—Ag eutectic phase, and an Ag precipitated phase are elongated into fibrous shapes by cold working.

The Cu—Ag alloy wire has a Vickers hardness according to JIS Z 2244 of 300 HV or more, and a specific resistance measured and calculated by the double bridge method of 3.0 μΩ·cm or less. The Cu—Ag alloy wire is suitable for applications of probe pin used to test the electrical properties of a test target such as a semiconductor integrated circuit. In addition to the above applications, the Cu—Ag alloy wire may be applied to wiring of electronic components, and can be applied to all applications including electrical connections.

(2) Method for Producing Cu—Ag Alloy Wire

Figure 1:
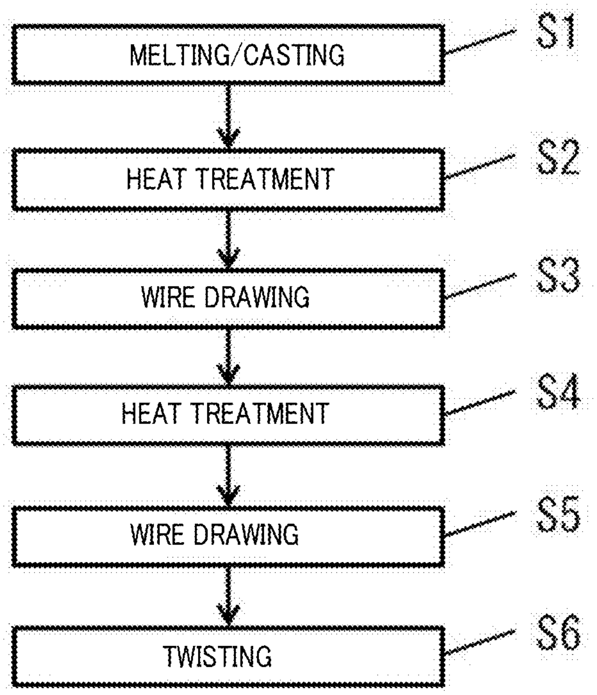
FIG. 1 is a flowchart chronologically illustrating a method for producing a Cu—Ag alloy wire.

FIG. 1 is a flowchart chronologically illustrating a method for producing a Cu—Ag alloy wire.

As illustrated in FIG. 1, in the method for producing a Cu—Ag alloy wire, processes are basically performed in the following order: melting/casting step S1, heat treatment step S2, wire drawing step S3, heat treatment step S4, wire drawing step S5, and twisting step S6.

In melting/casting step S1, a material (herein, the material may be more than one material) is melted at 1000 to 1400° C. to prepare a composition (molten metal) containing 0.1 to 30 mass % of Ag, with a remainder composed of Cu and unavoidable impurities.

The "material" may be any material as long as a composition containing 0.1 to 30 mass % of Ag, with a remainder composed of Cu and unavoidable impurities, can be obtained at a stage after melting. At a stage before melting, the "material" may be simple substances individually including Ag and Cu, or may be an integrated substance (compound) of Ag and Cu.

Thereafter, the melt (molten metal) is poured into a mold, cooled to room temperature within 0.5 to 60 minutes, thereby casting bar material A having a predetermined diameter, in which a mesh shaped Cu—Ag eutectic phases are formed in a Cu base.

In heat treatment step S2, bar material A is heated in a vacuum or an inert gas atmosphere at 300 to 700° C. for 1 to 60 hours to precipitate Ag dissolved in the Cu base as Ag precipitated phases. The heating temperature is preferably 400 to 500° C., and the heating time is preferably 5 to 10 hours. $N_2$ or Ar can be used as the inert gas.

The heat treatment at this time induces the precipitation of Ag precipitated phases, and mainly contributes to improving the hardness and reducing the specific resistance of the Cu—Ag alloy wire.

In wire drawing step S3, bar material A is drawn at a degree of cold working of 2.3 or more to produce wire rod B1. The "degree of cold working" at this time is a value represented by the following equation.

$$\text{Degree of cold working} = \ln((\text{cross-sectional area of bar material } A)/(\text{cross-sectional area of wire rod } B1))$$

In heat treatment step S4, wire rod B1 is heated at 300 to 700° C. for 1 to 60 hours in a vacuum or an inert gas atmosphere to anneal wire rod B1. The heating temperature is preferably 300 to 500° C., more preferably 300 to 400° C., and the heating time is preferably 5 to 50 hours. $N_2$ or Ar can be used as the inert gas.

In wire drawing step S5, wire rod B1 is drawn at a degree of cold working of more than 7.2 to produce wire rod B2. The "degree of cold working" at this time is a value represented by the following equation.

$$\text{Degree of cold working} = \ln((\text{cross-sectional area of wire rod } B1)/(\text{cross-sectional area of wire rod } B2))$$

The degree of cold working at this time is preferably 8.1 or more.

Heat treatment step S4 and wire drawing step S5 may be repeated a plurality of times.

In twisting step S6, wire rod B2 is twisted.

In twisting step S6, while the original bobbin (supply bobbin), on which wire rod B2 is wound, is rotated, wire rod B2 is wound from the supply bobbin to a collection bobbin, thereby twisting wire rod B2.

Figure 2:
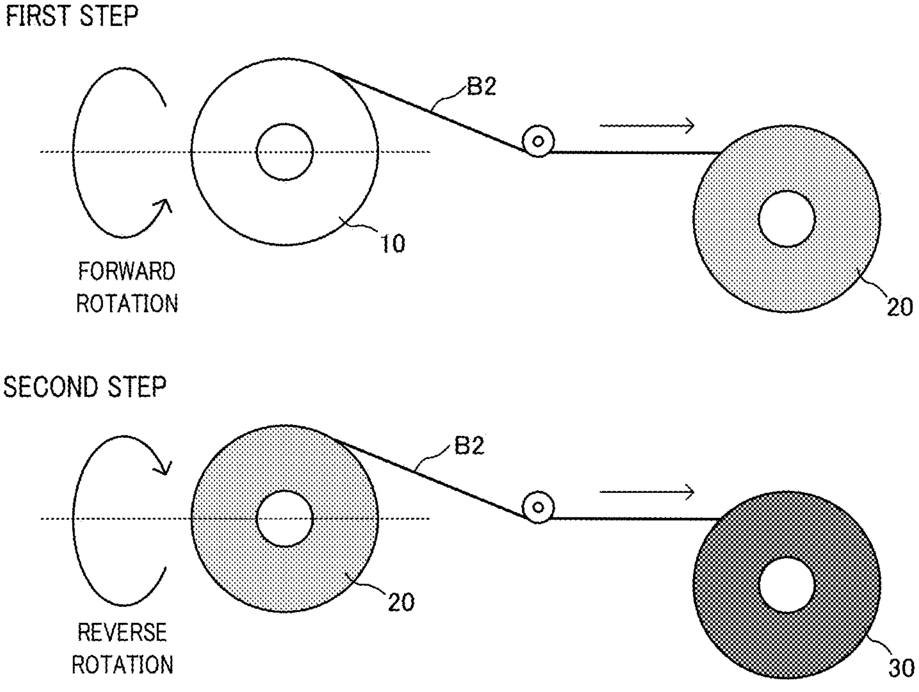
FIG. 2 schematically illustrates processing of a twisting process (herein also simply referred to as "twisting") step.

As illustrated in FIG. 2, in twisting step S6, two steps of twisting are performed specifically as follows: in the first step, while supply bobbin 10 is rotated in the forward direction (forward rotation), wire rod B2 is wound on collection bobbin 20; and in the second step, while the collection bobbin 20 is rotated in the reverse direction (reverse rotation), wire rod B2 is wound on another collection bobbin 30.

The amount of twisting (herein also referred to as twisting amount") of wire rod B2 (the twisting amount applied to wire rod B2) is defined by the following equation.

$$\text{"Twisting amount of wire rod } B2\text{"} = \text{rotational speed of supply bobbin[rpm]/linear speed of wire rod } B2[\text{mm/min}]$$

In twisting step S6, the twisting amount of wire rod B2 in the first step is set to be larger than the twisting amount of wire rod B2 in the second step.

Specifically, in twisting step S6, wire rod B2 is rotated in the forward direction with a twisting amount of 0.1 rotations/mm or more, and then wire rod B2 is rotated in the reverse direction with a twisting amount smaller than the a twisting amount during the forward rotation.

The twisting process of wire rod B2 mainly contributes to final hardness adjustment (improvement) while maintaining the electrical conductivity of a Cu—Ag alloy wire. In particular, in twisting step S6, the twisting is performed without applying heat treatment, thereby preventing the reduction in the Vickers hardness.

A Cu—Ag alloy wire can be produced through the processes from melting/casting step S1 to twisting step S6.

EXAMPLES (1) Preparation of Wire Rod Samples (1.1) Samples 1 to 4

Figure 3:
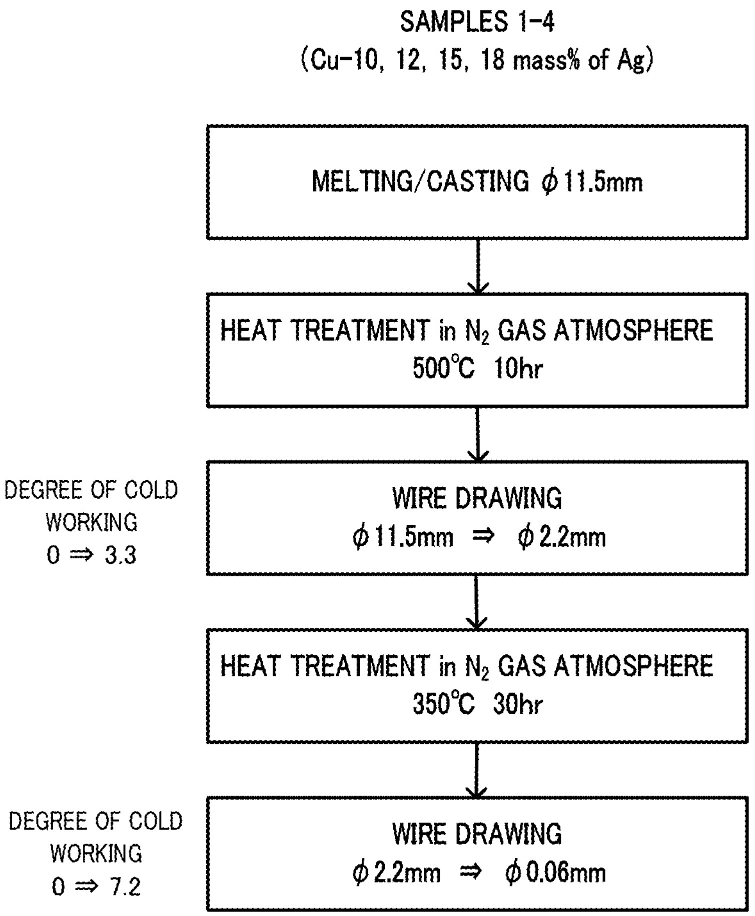
FIG. 3 is a flowchart chronologically illustrating a method for producing samples 1 to 4.

The method for preparing each of samples 1 to 4 is as illustrated in FIG. 3.

A material was heated and melted at 1000 to 1400° C. to prepare a composition (molten metal) having the composition ratio shown in Table 1.

The melt (molten metal) was then poured into a mold and cooled to room temperature within 10 minutes, thereby casting bar material A having a diameter of 11.5 mm.

Bar material A was then heated at 500° C. for 10 hours in an $N_2$ gas atmosphere.

Bar material A was then drawn from the diameter of 11.5 mm to a diameter of 2.2 mm to produce wire rod B1 with a degree of cold working of 3.3.

Wire rod B1 was then heated at 350° C. for 30 hours in an $N_2$ gas atmosphere.

Wire rod B1 was then drawn from the diameter of 2.2 mm to a diameter of 0.06 mm to produce wire rod B2 with a degree of cold working of 7.2.

(1.2) Samples 5 and 7

Figure 4:
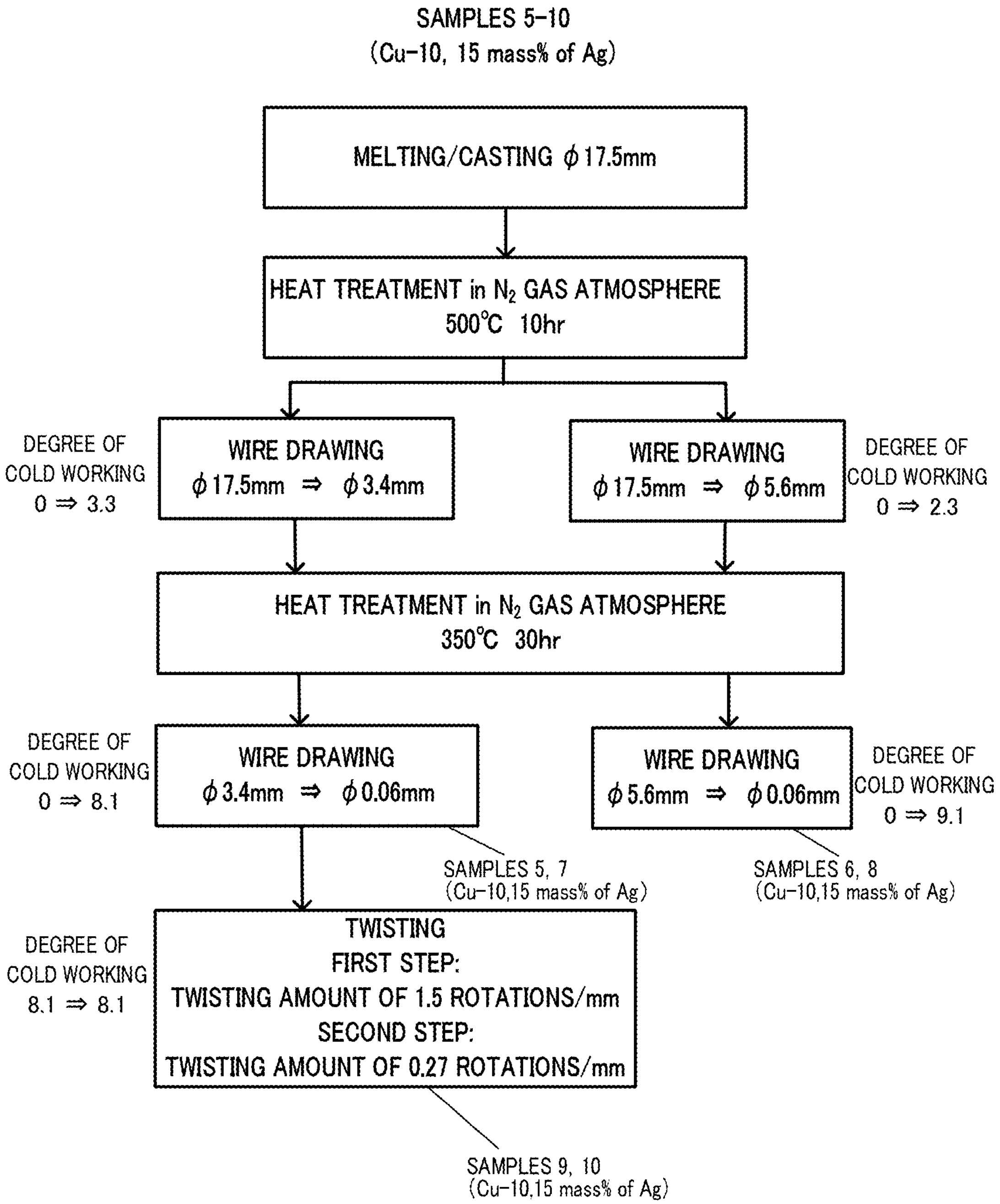
FIG. 4 is a flowchart chronologically illustrating a method for producing samples 5 to 10.

The method for preparing each of samples 5 and 7 is as illustrated in FIG. 4.

A material was heated and melted at 1000 to 1400° C. to prepare a composition (molten metal) having the composition ratio shown in Table 1.

The melt (molten metal) was then poured into a mold and cooled to room temperature within 10 minutes, thereby casting bar material A having a diameter of 17.5 mm.

Bar material A was then heated at 500° C. for 10 hours in an $N_2$ gas atmosphere.

Bar material A was then drawn from the diameter of 17.5 mm to a diameter of 3.4 mm to produce wire rod B1 with a degree of cold working of 3.3.

Wire rod B1 was then heated at 350° C. for 30 hours in an $N_2$ gas atmosphere.

Wire rod B1 was then drawn from the diameter of 3.4 mm to a diameter of 0.06 mm to produce wire rod B2 with a degree of cold working of 8.1.

(1.3) Samples 6 and 8

The method for preparing each of samples 6 and 8 is as illustrated in FIG. 4.

A material was heated and melted at 1000 to 1400° C. to prepare a composition (molten metal) having the composition ratio shown in Table 1.

The melt (molten metal) was then poured into a mold and cooled to room temperature within 10 minutes, thereby casting bar material A having a diameter of 17.5 mm.

Bar material A was then heated at 500° C. for 10 hours in an $N_2$ gas atmosphere.

Bar material A was then drawn from the diameter of 17.5 mm to a diameter of 5.6 mm to produce wire rod B1 with a degree of cold working of 2.3.

Wire rod B1 was then heated at 350° C. for 30 hours in an $N_2$ gas atmosphere.

As a measuring device, a Vickers hardness measuring device (AMT-X7AFS) manufactured by Matsuzawa Co., Ltd. was used. The measurement conditions were as follows.

Load: 25 gf

Holding time: 15 seconds

Table 1 shows the results.

(2.2) Measurement of Tensile Strength

The tensile strength of each of the five samples was measured according to JIS Z 2241, and the average value (MPa) was calculated. Table 1 shows the calculation results.

(2.3) Measurement of Specific Resistance and Electrical Conductivity

Using the double bridge method, the electrical resistance of each of the five samples was measured in a room controlled at 20° C. (+2° C.), and the average values of specific resistance (μΩ·cm) and electrical conductivity (% IACS) were calculated. The distance between voltage terminals was 500 mm. Table 1 shows the calculation results.

(2.4) Evaluation of Linearity

The radius of curvature of each sample was measured to evaluate linearity.

Specifically, using a digital microscope VHX-6000 manufactured by Keyence Corporation, three points were randomly selected from the arc of each sample and the radius of curvature (mm) was calculated. Table 1 shows the calculation results.

TABLE 1

| Sample No. | Composition ratio | Hardness [HV] | Tensile strength [MPa] | Specific resistance (μΩ · cm) | Electrical conductivity [% IACS] | Radius of curvature [mm] |
|---|---|---|---|---|---|---|
| 1 | Cu—10Ag | 270 | 1517 | 2.52 | 68.5 | 200 mm> |
| 2 | Cu—12Ag | 280 | 1601 | 2.62 | 65.9 | |
| 3 | Cu—15Ag | 283 | 1660 | 2.76 | 62.6 | |
| 4 | Cu—18Ag | 283 | 1623 | 2.79 | 61.8 | |
| 5 | Cu—10Ag | 320 | 1674 | 2.72 | 63.4 | 200 mm> |
| 6 | Cu—10Ag | 303 | 1664 | 2.84 | 60.7 | |
| 7 | Cu—15Ag | 334 | 1745 | 2.78 | 62.3 | |
| 8 | Cu—15Ag | 325 | 1798 | 2.95 | 58.3 | |
| 9 (Twisted) | Cu—10Ag | 325 | 1680 | 2.70 | 63.9 | ≥300 mm |
| 10 (Twisted) | Cu—15Ag | 340 | 1753 | 2.76 | 62.5 | |
| Reference example 1 | Pd alloy | 190-400 | 965-1170 | 33.2 | 5.2 | — |
| Reference example 2 | Be alloy (C17530) | 210-260 | 700-870 | 2.8 | 63 | — |

Wire rod B1 was then drawn from the diameter of 5.6 mm to a diameter of 0.06 mm to produce wire rod B2 with a degree of cold working of 9.1.

(1.4) Samples 9 and 10

The method for preparing each of samples 9 and 10 is as illustrated in FIG. 4.

Wire rod B2 was produced in the same manner as samples 5 and 7.

The twisting illustrated in FIG. 2 was then performed on wire rod B2. In the first step, the twisting amount of wire rod B2 was set to 1.5 rotations/mm, and wire rod B2 was rotated in the forward direction. In the second step, the twisting amount of wire rod B2 was set to 0.27 rotations/mm, and wire rod B2 was rotated in the reverse direction.

(2) Evaluation of Properties of Wire Rod Samples (2.1) Measurement of Vickers Hardness The Vickers hardness was measured by a method in accordance with JIS Z2244.

(3) Summary

Table 1 shows the results such that samples 5 to 10 have a Vickers hardness of 300 HV or more and a specific resistance of 3.0 μΩ·cm or less. In particular, twisting wire rod B2 achieves the radius of curvature of 300 mm or more.

This application is a National Phase of PCT Patent Application No. PCT/JP2023/019364, having International filing date of May 24, 2023, which claims priority based on Japanese Patent Application No. 2022-092485, filed on Jun. 7, 2022, the entire contents of which including the specification and the drawings are incorporated herein by reference.

REFERENCE SIGNS LIST

S1 Melting/casting step

S2 Precipitation heat treatment step

S3 Wire drawing step
S4 Intermediate heat treatment step
S5 Wire drawing step
S6 Twisting step
10 Supply bobbin
20 Collection bobbin
30 Collection bobbin

The invention claimed is:

1. A Cu—Ag alloy wire, comprising:

0.1 to 30 mass % of Ag, with a remainder composed of Cu and unavoidable impurities, wherein the Cu—Ag alloy wire has a Vickers hardness of 300 HV or more and a specific resistance of 3.0 μΩ·cm or less, the Cu—Ag alloy wire has a radius of curvature of 300 mm or more, the Cu—Ag alloy wire has a tensile strength of 1680 MPa or more, the Cu—Ag alloy wire has an electrical conductivity of 62.5% IACS or more, and wherein the radius of curvature is calculated using a digital microscope by selecting three points on the Cu—Ag alloy wire and finding the radius of the circle passing through them.

2. A method for producing the Cu—Ag alloy wire according to claim 1, the method comprising:

casting a bar material containing 0.1 to 30 mass % of Ag, with a remainder composed of Cu and unavoidable impurities;

heating the bar material at 300 to 700° C. for 1 to 60 hours in a vacuum or an inert gas atmosphere;

producing a first wire rod by drawing the bar material at a degree of cold working of 2.3 or more, the bar material having been subjected to the heating;

heating the first wire rod at 300 to 700° C. for 1 to 60 hours in a vacuum or an inert gas atmosphere; and producing a second wire rod having a Vickers hardness of 300 HV or more and a specific resistance of 3.0 μΩ·cm or less by drawing the first wire rod at a degree of cold working of more than 7.2, the first wire rod having been subjected to the heating.

3. The method according to claim 2, wherein in the producing the second wire rod, the degree of cold working is 8.1 or more.

4. The method according to claim 2, further comprising:

twisting the second wire rod, wherein in the twisting the second wire rod, the second wire rod is subjected to rotation in a forward direction with a twisting amount of 0.1 rotations/mm or more, and then subjected to rotation in a reverse direction with a twisting amount smaller than the twisting amount during the rotation in the forward direction.

* * * * *